US012705891B2

(12) United States Patent
Sud et al.

(10) Patent No.: US 12,705,891 B2
(45) Date of Patent: Aug. 11, 2026

(54) METHODS AND APPARATUS FOR GENERATING IMAGES OF OBJECTS DETECTED IN VIDEO CAMERA DATA

(71) Applicant: Verkada Inc., San Mateo, CA (US)

(72) Inventors: Bhavna Sud, Cupertino, CA (US); Song Cao, Foster City, CA (US); Kabir Chhabra, San Francisco, CA (US); Yi Xu, Belmont, CA (US); Priyanka Sekhar, San Francisco, CA (US)

(73) Assignee: Verkada Inc., San Mateo, CA (US)

( * ) Notice: Subject to any disclaimer, the term of this patent is extended or adjusted under 35 U.S.C. 154(b) by 291 days.

(21) Appl. No.: 18/643,771

(22) Filed: Apr. 23, 2024

(65) Prior Publication Data

US 2025/0329161 A1 Oct. 23, 2025

(51) Int. Cl.
*G06V 10/96* (2022.01)
*G06T 3/4046* (2024.01)
(Continued)

(52) U.S. Cl.
CPC ............ *G06V 20/41* (2022.01); *G06T 3/4046* (2013.01); *G06T 3/4053* (2013.01);
(Continued)

(58) Field of Classification Search
CPC ........ G06V 20/41; G06V 10/96; G06V 20/52; G06V 20/49; G06V 40/172; G06V 10/82;
(Continued)

(56) References Cited

U.S. PATENT DOCUMENTS

| | | | |
|---|---|---|---|
| 8,688,675 | B2 | 4/2014 | Albers et al. |
| 9,361,521 | B1 | 6/2016 | McLean et al. |

(Continued)

FOREIGN PATENT DOCUMENTS

| | | | |
|---|---|---|---|
| WO | WO-2020242466 | A1 | 12/2020 |
| WO | WO-2021194746 | A1 | 9/2021 |
| WO | WO-2024243141 | A1 | 11/2024 |

OTHER PUBLICATIONS

International Search Report and Written Opinion for PCT Application No. PCT/US2025/025072, by Verkada Inc., mailed Jun. 17, 2025; 10 pages.

(Continued)

*Primary Examiner* — Syed Haider
(74) *Attorney, Agent, or Firm* — COOLEY LLP

(57) ABSTRACT

A non-transitory, processor-readable medium stores instructions that, when executed by a processor, cause the processor to receive video-derived detection data associated with a plurality of persons. For a first person from the plurality of persons, a portion of the video-derived detection data associated with the first person is assigned to a first motion track based on a motion model, and a closeup image of the first person is generated based on the portion of video-derived detection data. A quality score is generated based on the closeup image, and the closeup image is assigned to the first motion track based on the quality score. The first motion track is selected from a plurality of motion tracks associated with the plurality of persons. Using a neural network, first identity data is generated based on the closeup image, and the first motion track is updated based on the first identity data.

23 Claims, 7 Drawing Sheets
(3 of 7 Drawing Sheet(s) Filed in Color)

(51) Int. Cl.

| | |
|---|---|
| ***G06T 3/4053*** | (2024.01) |
| ***G06T 7/00*** | (2017.01) |
| ***G06T 7/277*** | (2017.01) |
| ***G06V 10/774*** | (2022.01) |
| ***G06V 10/82*** | (2022.01) |
| ***G06V 10/98*** | (2022.01) |
| ***G06V 20/40*** | (2022.01) |
| ***G06V 20/52*** | (2022.01) |
| ***G06V 40/16*** | (2022.01) |

(52) U.S. Cl.

CPC ............ *G06T 7/0002* (2013.01); *G06T 7/277* (2017.01); *G06V 10/774* (2022.01); *G06V 10/82* (2022.01); *G06V 10/96* (2022.01); *G06V 10/993* (2022.01); *G06V 20/49* (2022.01); *G06V 20/52* (2022.01); *G06V 40/172* (2022.01); *G06T 2207/10016* (2013.01); *G06T 2207/20081* (2013.01); *G06T 2207/20084* (2013.01); *G06T 2207/30168* (2013.01); *G06T 2207/30201* (2013.01); *G06T 2207/30232* (2013.01)

(58) Field of Classification Search

CPC .... G06V 10/993; G06V 10/774; G06T 7/277; G06T 3/4046; G06T 3/4053; G06T 7/002; G06T 2207/10016; G06T 2207/20081; G06T 2207/20084; G06T 2207/30232; G06T 2207/30201; G06T 2207/30168

See application file for complete search history.

(56) References Cited

U.S. PATENT DOCUMENTS

| | | | | |
|---|---|---|---|---|
| 10,438,164 | B1 | 10/2019 | Xiong et al. | |
| 11,429,664 | B1 | 8/2022 | Xu et al. | |
| 11,586,667 | B1 | 2/2023 | Xu et al. | |
| 12,033,348 | B1 | 7/2024 | Cao et al. | |
| 12,067,755 | B1 | 8/2024 | Nan et al. | |
| 12,254,686 | B2 | 3/2025 | Mwaura et al. | |
| 2006/0256210 | A1 | 11/2006 | Ryall et al. | |
| 2007/0257986 | A1 | 11/2007 | Ivanov et al. | |
| 2007/0291118 | A1 | 12/2007 | Shu et al. | |
| 2008/0091526 | A1 | 4/2008 | Shoemaker | |
| 2009/0238411 | A1 | 9/2009 | Adiletta et al. | |
| 2010/0238285 | A1 | 9/2010 | DeSimone et al. | |
| 2012/0062732 | A1 | 3/2012 | Marman et al. | |
| 2013/0091470 | A1 | 4/2013 | Sciammarella et al. | |
| 2013/0124998 | A1 | 5/2013 | Pendergast et al. | |
| 2014/0369596 | A1 | 12/2014 | Siskind et al. | |
| 2015/0248429 | A1 | 9/2015 | Pregueiro et al. | |
| 2016/0171852 | A1 | 6/2016 | Lin et al. | |
| 2016/0232234 | A1 | 8/2016 | Baek et al. | |
| 2016/0350597 | A1* | 12/2016 | Bataller | G06T 7/292 |
| 2017/0024986 | A1 | 1/2017 | Austin | |
| 2017/0078767 | A1 | 3/2017 | Borel et al. | |
| 2018/0113577 | A1 | 4/2018 | Burns et al. | |
| 2018/0115788 | A1 | 4/2018 | Burns et al. | |
| 2019/0034734 | A1 | 1/2019 | Yen et al. | |
| 2019/0043201 | A1 | 2/2019 | Strong et al. | |
| 2019/0244366 | A1 | 8/2019 | Yu et al. | |
| 2019/0377957 | A1 | 12/2019 | Johnston et al. | |
| 2020/0005024 | A1* | 1/2020 | Silva | G06V 40/166 |
| 2020/0334850 | A1* | 10/2020 | Ross | G06V 20/52 |
| 2021/0027068 | A1 | 1/2021 | Gayatri et al. | |
| 2021/0233255 | A1 | 7/2021 | Celestini | |
| 2022/0207282 | A1* | 6/2022 | Dong | G06V 40/166 |
| 2022/0254162 | A1 | 8/2022 | Felemban et al. | |
| 2023/0087657 | A1* | 3/2023 | Chen | G06V 40/172 382/118 |
| 2023/0112584 | A1* | 4/2023 | Shah | G06T 7/292 348/143 |
| 2024/0062408 | A1* | 2/2024 | Park | G06T 7/70 |
| 2024/0386715 | A1 | 11/2024 | Mwaura et al. | |
| 2025/0182466 | A1 | 6/2025 | Mwaura et al. | |

OTHER PUBLICATIONS

Notice of Allowance for U.S. Appl. No. 18/320,467, by Mwaura et al., mailed Nov. 6, 2024; 7 pages.

Non-Final Office Action mailed May 16, 2024 for U.S. Appl. No. 18/320,467, 40 pages.

Albers, et al., "Smart Search & Retrieval on Video Databases," IEEE, 2006, pp. 475-476.

Author Unknown, "Facial Recognition in a Crowd," Kintronics IP Security Solutions, first publication date unknown [online], published at https://kintronics.com/solutions/ip-camera-systems/facial-recognition/ on Oct. 7, 2022, 4 pages.

Author Unknown, "Real-time facial recognition using your existing cameras," Oosto Facial Recognition Technology, first publication date unknown [online], published at https://oosto.com/ on Nov. 7, 2023, 6 pages.

Carta et al. "Efficient Thumbnail Identification through Object Recognition," Webist 2020—16th International Conference on Web Information Systems and Technologies, 2020, 209-216.

Chen, L. et al., "Real-Time Multiple People Tracking with Deeply Learned Candidate Selection and Person Re-Identification," 2018 IEEE International Conference on Multimedia and expo (ICME). IEEE, 2018, 6 pages.

Co-pending U.S. Appl. No. 18/320,467, inventors Mwaura; David et al., filed May 19, 2023.

Co-pending U.S. Appl. No. 18/320,617, inventors Nan; Hao et al., filed May 19, 2023.

Co-pending U.S. Appl. No. 18/450,085, inventors Cao; Song et al., filed Aug. 15, 2023.

Final Office Action for U.S. Appl. No. 18/320,467 dated Dec. 20, 2023, 35 pages.

Gaikwad, B. et al., "End-to-end person re-identification: Real-time video surveillance over edge-cloud environment," Computers and Electrical Engineering, Apr. 2022, 99:107824, 14 pages.

Golding et al., "Machine Learning in Distributed Edge Networks: Optimizing for Security and Latency in Surveillance Systems," Department of Electrical Engineering and Computer Sciences at UC Berkeley, 2018, 11 pages.

Hata T., et al., "Surveillance system with mega-pixel scalable transcoder." Visual Communication and Image Processing 2007, vol. 6508, Jan. 29, 2007, 13 pages.

Kong et al., "Real-time facial expression recognition based on iterative transfer learning and efficient attention network," IET Image Processing, 2022, vol. 16, 1694-1708.

Lu, J. et al., "Object-QA: Towards High Reliable Object Quality Assessment," arXiv preprint arXiv:2005.13116v1 [cs.CV] May 27, 2020, 9 pages.

Luetto, S., "People counting using detection networks and self calibrating cameras on edge computing," Politecnico Di Torino: Corso di Laurea in Ingegneria Matematica (Polytechnic of Turin: Degree Course in Mathematical Engineering), Dec. 2019. Retrieved online at https://webthesis.biblio.polito.it/12732/1/tesi.pdf on Apr. 25, 2024, 114 pages.

Non-Final Office Action for U.S. Appl. No. 18/320,467 dated Jul. 27, 2023, 30 pages.

Non-Final Office Action for U.S. Appl. No. 18/320,617 dated Aug. 14, 2023, 25 pages.

Non-Final Office Action for U.S. Appl. No. 18/450,085 dated Oct. 31, 2023, 37 pages.

Notice of Allowance for U.S. Appl. No. 18/320,617 dated Apr. 2, 2024, 8 pages.

Notice of Allowance for U.S. Appl. No. 18/450,085 dated Feb. 29, 2024, 11 pages.

Tissainayagam P., et al., "Visual tracking with automatic motion model switching." Pattern Recognition 34.3 (2001): 641-660.

Tsakanikas, V., "Enabling artificial intelligence analytics on the edge," London South Bank University School of Engineering, 2022. Retrieved online at https://web.archive.org/web/20221208021844id_/

(56) References Cited

OTHER PUBLICATIONS https://openresearch.lsbu.ac.uk/download/a8515f27c69b739d4e8eb62bf03529de322fb4b028ef8ccfa42dd2d360813aa7/4928056/Tsakanikas_thesis_library.pdf on Apr. 25, 2024, 209 pages.
Yuan, et al. "Sentence Specified Dynamic Video Thumbnail Generation," arXiv:1908.04052v2 [cs.CV], Oct. 16, 2019, 14 pages.
Zhou et al., "Deployment of Facial Recognition Models at the Edge: A Feasibility Study," 2020 21st Asia-Pacific Network Operations and Management Symposium (APNOMS), Daegu, South Korea, 2020. Retrieved online at https://eprints.gla.ac.uk/221589/7/221589.pdf on Apr. 25, 2024, 214-219.
International Search Report and Written Opinion for PCT Application No. PCT/US2024/030232 mailed Sep. 18, 2024, 10 pages.

* cited by examiner

METHODS AND APPARATUS FOR GENERATING IMAGES OF OBJECTS DETECTED IN VIDEO CAMERA DATA

FIELD

The present disclosure generally relates to video surveillance, and more specifically, to systems and methods for performing facial recognition based on cropped images generated from video data.

BACKGROUND

Image processing techniques exist for performing object detection. Object detection can include the detection of depicted objects such as people and license plates. Applications of object detection include, for example, video surveillance and facial recognition.

SUMMARY

In some embodiments, a non-transitory, processor-readable medium stores instructions that, when executed by a processor, cause the processor to receive video-derived detection data associated with a plurality of persons. For a first person from the plurality of persons, a portion of the video-derived detection data associated with the first person is assigned to a first motion track based on a motion model, and a closeup image of the first person is generated based on the portion of video-derived detection data. The instructions also cause the processor to generate a quality score based on the closeup image and assign the closeup image to the first motion track based on the quality score. The first motion track is selected from a plurality of motion tracks associated with the plurality of persons, based on at least one of the quality score or a previous selection of a second motion track (1) associated with a second person from the plurality of persons and (2) from the plurality of motion tracks. Using a neural network, first identity data is generated based on the closeup image, and the first motion track is updated based on the first identity data.

In some embodiments, an apparatus comprises a processor and a memory operably coupled to the processor, the memory storing instructions to cause the processor to receive a video stream including a sequence of video frames and generate a compressed sequence of video frames based on the sequence of video frames. Using a first neural network and based on the compressed sequence of video frames, a detection of a first person and a detection of a second person are generated. The detection of the first person is assigned to a first motion track and the detection of the second person is assigned to a second motion track different from the first motion track. Based on the detection of the first person, the instructions cause the processor to generate a first image that depicts at least a portion of the first person and that includes a cropped portion of a first video frame from the sequence of video frames. Based on the detection of the second person, a second image is generated, the second image depicting at least a portion of the second person and including a cropped portion of a second video frame from the sequence of video frames. A first quality score for the first image and a second quality score for the second image are generated, and the first motion track is selected based on at least one of (1) the first quality score being above a predefined threshold value, (2) the first quality score being greater than the second quality score, or (3) a previous selection of the second motion track. In response to selecting the first motion track and using a second neural network, first identity data is generated for the first person based on the first image. The instructions further cause the processor to cause display, via a graphical user interface (GUI), of a representation of the first identity data.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
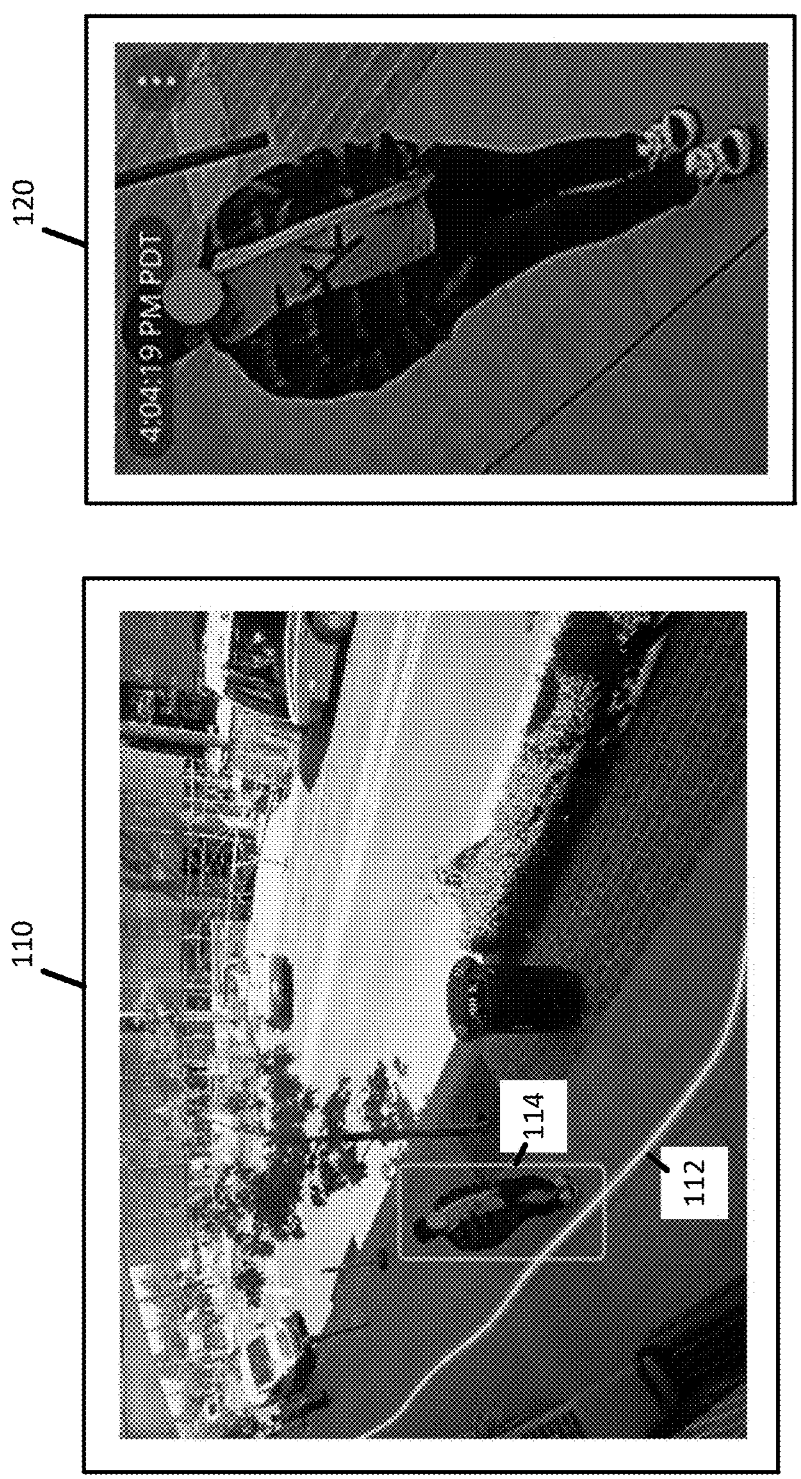
FIG. 1 includes an annotated image showing an identified person from a video stream, a motion track generated for the person, and a cropped image generated based on the motion track, according to some embodiments.

Some known video systems cannot typically perform facial recognition for a plurality of persons depicted in video data. For example, such known video systems do not typically perform facial recognition via a processor included in a video camera, much less within a timeframe contemporaneous to the recording of the plurality of persons in the video data. At least some systems, methods, and apparatuses described herein, in contrast, efficiently perform facial recognition by tracking a plurality of persons, generating cropped images (also referred to herein as "hyperzoom images" or "closeup images") for each person from the plurality of persons, and prioritizing processing of the cropped images (e.g., to produce identity data) based on quality scores and/or elapsed time since a depicted person was previously processed.

For example, in some embodiments, a compute device can be configured to receive a video stream from a video camera system, the video stream including a sequence of temporally arranged video frames. The compute device can be configured to detect (e.g., via a processor) an object that is depicted in the video stream. Detecting an object can include, for example, generating a classification for the object (e.g., identifying the object as a human), generating a bounding box for the object, classifying features of the object, segmenting a pixel(s) that depicts the object, and/or the like. Based on the classification of the object (e.g., based on the object being classified as a person), the compute device can be further configured to calculate a motion associated with the object and characterize said motion (e.g., by associating said motion with a confirmed motion track, as described herein). Based on the confirmed motion track and the generated object identification/classification, the compute device can be configured to generate a cropped image(s) of the object. The cropped image(s) can be generated from a cropped region(s) of the video frame(s) that depict the object. The compute device can be further configured to generate a quality score(s) (e.g., a person score(s)) for the cropped image(s) based on image resolution, lighting conditions, object orientation, depicted object position within the respective video frame from which the cropped image is generated, object depiction size, and/or the like, as described herein.

If multiple objects (e.g., persons) are depicted in the video stream, the compute device can generate a motion track for each object, and for each motion track, the compute device can generate a cropped image(s). For example, two persons can be within a field of view of a video camera concurrently, such that the two persons are depicted in a video frame from the video stream generated by the video camera. The compute device can detect each of the two persons, generate a motion track for each person, generate cropped images for each person, and perform facial recognition for each person. The order in which the facial recognition tasks for the respective persons is executed (e.g., the order in which the first person is processed relative to the second person) can be determined based, by way of non-limiting example, on (1) respective quality scores for the respective cropped images generated for each person and/or (2) respective times since facial recognition was last performed for each person.

The compute device can be further configured to send the cropped image(s) (e.g., via a websocket) to a remote compute device, which can be configured to perform a facial recognition task if, for example, the compute device cannot perform the facial recognition task within a predefined time period, as described herein. In some implementations, the compute device can be further configured to send the cropped image(s) to a database based on the respective quality score, such that the cropped image(s) can be used as an exemplar(s) for future searches involving the person depicted in the cropped image(s), as described herein.

The compute device, as part of the video camera system, can be local to a video camera or remote from a video camera. User inputs made via the compute device (e.g., via a graphical user interface (GUI)) can be communicated to the video camera system and/or used by the video camera system during its operations, e.g., in the context of one or more video monitoring operations. Based on the cropped image(s), an alert or alarm may be generated (optionally as part of the video monitoring operations) by the video camera system, the remote compute device, and/or the remote mobile compute device, and can be communicated to the user and/or to one or more other compute devices. The alert or alarm can be communicated, for example, via a software "dashboard" displayed via a GUI of one or more compute devices operably coupled to or part of the video camera system. The alert or alarm functionality can be referred to as, or as being part of, an "alarm system."

As used herein, "object motion" can, in some implementations, have an associated sensitivity, which may be user-defined/adjusted and/or automatically defined. A deviation of one or more parameters within or beyond the associated sensitivity may register as object motion. The one or more parameters can include, by way of non-limiting example, and with respect to a pixel(s) associated with the object, one or more of: a difference in a pixel appearance, a percentage change in light intensity for a region or pixel(s), an amount of change in light intensity for a region or pixel(s), an amount of change in a direction of light for a region or pixel(s), etc.

In some embodiments, the detection of object motion can be based at least in part on semantic data. Stated another way, the object motion may be tracked based on the type of object that is changing within the field of view of the video camera. For example, in some implementations, the object can be tracked based on the object being identified as a person (as opposed to, for example, a car). In some implementations, a different motion model and/or a uniquely parameterized and/or modified motion model can be used to detect the object motion based on semantic data, as described herein.

In some embodiments, the processing involved as part of cropped image generation and/or facial recognition occurs at/on a video camera (also referred to herein as an "edge device") itself, such as a security camera/surveillance camera. For example, one or more methods described herein can be implemented in code that is onboard the video camera. The code can include instructions to automatically classify at least one object that is depicted in a sequence of video frames (e.g., a video clip). In some implementations, the sequence of video frames may include a sequence of temporally arranged compressed images (e.g., down sampled images and/or images that are reduced in size and/or pixel resolution). For example, the video camera may capture video data (e.g., a sequence of uncompressed and/or high-resolution video frames) and the compute device can compress the video data to generate the sequence of temporally arranged compressed images. The compute device can be configured to identify an occurrence of an object that is depicted within a compressed image from the sequence of temporally arranged compressed images. The occurrence can be included in, for example, video-derived detection data. In some implementations, the compute device can include a processor that is configured to use a neural network (e.g., a convolutional neural network (CNN) adapted for image recognition) to identify the occurrence of the object (i.e., to generate the classification for the object).

As a result of identifying the occurrence of an object, the compute device can be configured to calculate motion associated with the object occurrence. For example, the compute device can be configured to calculate the motion based on whether the identified/classified object is an object of interest (e.g., a human, a vehicle, a dog, etc.) or is not an object of interest (e.g., a bird, an insect, a wind-blown tree, etc.). The compute device can be further configured to select a motion model from a plurality of motion models based on the object identification/classification, where the selected model is configured (e.g., parameterized) for the identified object type. Calculating motion can include assigning the object occurrence to a motion track (e.g., assigning an object detection to one track ID from a set of track IDs). For example, the object occurrence detected within a compressed image can be associated with an additional object occurrence(s) (e.g., an object occurrence(s) included in historical video-derived detection data) detected in previous compressed images from the sequence of temporally arranged compressed images. The compute device can determine that a current object occurrence is associated with a previous object occurrence(s) (e.g., the object being the same for all occurrences) based on a motion model that generates an expected motion for an object. This expected motion generated by the motion model can be used to estimate an object's future location. To compensate for error within the motion model, the object's estimated location (determined based on an earlier compressed image) can be compared to the object's actual location, which can be inferred by the object's position within a later compressed image from the sequence of temporally arranged compressed images.

In some implementations, the motion model can include a Kalman filter and/or a suitable tracking filter (e.g., a linear Kalman filter, an extended Kalman filter, an unscented Kalman filter, a cubature Kalman filter, a particle filter, and/or the like). For example, a linear Kalman filter can be used when an object exhibits dynamic motion that can be described by a linear model and the detections (i.e., measurements) are associated with linear functions of a state vector. In some implementations, the compute device can select a Kalman filter from a plurality of Kalman filters based on the object identification, where parameters for each Kalman filter are defined based on the type of object (e.g., car, human, etc.) represented by the identification. Each type of object, for example, can be associated with a nominal motion that is described by the respective Kalman filter.

Based on expected motion generated by the motion model, the compute device can be configured to automatically generate and/or automatically update a motion track that is associated with the object. A motion track can include, for example, a set of object detection(s) and the time(s) and/or video frame(s) at which the detection(s) was recorded. For example, a plurality of objects can be depicted in video data, and each object from the plurality of objects can have an associated motion. In some instances, at least two of these objects can be associated with the same identification (e.g., the objects can include two different humans in close proximity to one another). To determine whether object detections in two or more compressed images from the sequence of temporally arranged compressed images are associated with an object in motion or two different objects, the motion model can determine a likelihood and/or feasibility that the depictions of the object are the result of motion of that object or are the result of the detections being associated with a plurality of objects. In some implementations, the two or more compressed images can each be associated with a time stamp. These time stamps can be used to determine whether an object of a specified type (as determined by the identification) could feasibly undergo motion within a time period defined by the time stamps to result in a change in location depicted between the two or more compressed images. For example, the motion model can be configured to differentiate between (1) two humans appearing in different locations within different frames and (2) a human in motion based, at least in part, on an average, probable, and/or possible human running speed.

An object detection can be added to an existing motion track if the motion model indicates that the object's displacement within a compressed image is possible and/or feasible based on a motion estimate generated by the motion model for an earlier object detection from a previous compressed image. If the object detection cannot be matched to an existing motion track, a new motion track can be generated for the object, and subsequent detections of the object in later compressed images can be added to that motion track based on the motion model.

A motion track can be confirmed based on the number of object detections that are added to that track (i.e., the length of the track) and/or based on a confidence of the detections that are added to the track (i.e., a likelihood that an object is of a type represented by the generated identification). For example, a motion track can remain unconfirmed until two or more object detections from two or more compressed images are added to the motion track. In some implementations, a motion track can remain unconfirmed until two or more object detections that each has a confidence above a threshold are added to the motion track. A motion track can be deleted based on a predefined length of time and/or when a predefined number of successive compressed images does not include an object detection that is added to the motion track. A deleted motion track can be reinstated if an object detection is generated within a predefined time period (e.g., as measured from a time when the motion track was deleted) and the object detection is in accordance with the motion model.

Motion tracking based on streamed video frames generated by the video camera can be performed continuously, iteratively, according to a predefined time interval (e.g., regularly), and/or according to a predefined schedule.

At least one cropped image depicting the object can be generated based on the motion track being confirmed. The cropped image can include, for example, a closeup image of an object (e.g., a person) associated with a confirmed motion track. In some instances, generating cropped images only for confirmed motion tracks can prevent false alarms and/or unnecessary alerts for detections of stationary objects (e.g., parked cars) and/or objects undergoing transient and/or short-lived motion (e.g., a rustling tree). Alternatively, in some implementations, the at least one cropped image depicting the object can be generated based on detection data indicating that the object is, for example, a person. In some embodiments, the at least one cropped image can be generated from the uncompressed video data (e.g., the temporally arranged uncompressed images), such that the at least one cropped image has a greater image resolution than the compressed image(s) used to generate the object identification and/or the motion track for the object. A cropped image can include a cropped region of an uncompressed image, where the cropped region includes a depiction of an object associated with a confirmed motion track. In some instances, if a plurality of objects is present within a video frame, and each object has an associated motion (e.g., multiple confirmed motion tracks are concurrently associated with a video frame), a plurality of cropped images can be generated from the video frame, such that each cropped image(s) depicts a respective object from the plurality of remaining objects. In some implementations, a plurality of cropped images can be generated from a plurality of temporally arranged uncompressed images that are associated with a plurality of temporally arranged compressed images depicting the object undergoing motion. In some implementations, the number of cropped images that are generated for a confirmed motion track can be based on the object identification and/or a length of time that the object is depicted in the video data (e.g., the length of the motion track associated with the object). For example, a greater number of cropped images can be generated for a first human that is loitering within the camera field of view, and fewer cropped images can be generated for a second human that is briefly transiting through the field of view.

The compute device can be configured to generate a quality score(s) (e.g., a "person quality score") for each cropped image that is generated based on the confirmed object track and/or the classification of the object (e.g., as a person). In some implementations, the quality score can be based on the object type as determined by the generated identification. For example, a quality score for a cropped image of an object identified as a human can be based on a criterion or criteria specific to objects identified as human. In some implementations, such criterion or criteria can include a presence, an orientation and/or a visibility of the face of the object identified as human. If the face is oriented away from the video camera (i.e., obscured from the video camera's field of view and/or not visible or partially visible in the cropped image), a penalty can be applied to the quality score, resulting in a lower quality score. If the face is oriented towards the video camera (e.g., unobstructed from the video camera's field of view and/or substantially visible (e.g., at least 50% of the face is visible) in the cropped image), an increase can be applied to the quality score.

A quality score for a cropped image can also be based on a detected object's location (as depicted) in the image (e.g., the uncompressed video frame/image) from which the cropped image was generated. For example, if the depicted object appears towards the edge of the video frame (i.e., the cropped image is cropped from a region of the uncompressed video frame that is proximal to the edge of the uncompressed video frame), a penalty can be applied to that cropped image. Said differently, an uncompressed video frame and/or image can include a first pixel that is associated with the depicted object (e.g., a pixel is disposed substantially centrally (e.g., within 20% of the center of the frame) in the depiction of the object) and a second pixel that is disposed substantially centrally in the uncompressed video frame and/or image. The image quality score can be based on a distance between the first pixel and the second pixel. For example, the quality score can be penalized for a cropped image that has a larger distance between the first pixel and second pixel compared to a cropped image that has a smaller distance.

In some implementations, a quality score for a cropped image can be based on a size of the object depicted in the cropped image. For example, an object can be associated with a smaller number of pixels if the object is located further away from the video camera. The quality score can be based on a size and/or resolution metric (e.g., a metric based on a number of pixels associated with the object), where the quality score is penalized based on a size metric that indicates that the object is or was located distantly (e.g., at a distance exceeding a predefined threshold distance) from the video camera. In some implementations, the quality metric can be based on a clarity metric (e.g., a metric associated with a lighting condition, contrast, haze, and/or the like).

After a plurality of cropped images has been generated (e.g., over time) for an object that is associated with a confirmed motion track, the compute device can be configured to select a cropped image from the plurality of cropped images as a "best cropped image" based on the quality score associated with that cropped image. For example, the cropped image can be selected based on the quality score for that cropped image being greater than the quality scores for the remining cropped image(s) from the plurality of cropped images. A cropped image can be selected for each motion track associated with each person from a plurality of persons to produce a set of selected cropped images. The compute device can be configured to transmit each cropped image from the set of selected cropped images (e.g., each selected cropped image associated with the respective persons and/or motion tracks) to a remote compute device (e.g., a backend server, high performance computer, backend compute device, and/or the like). The remote compute device can be configured to execute a facial recognition task(s) on a selected cropped image(s) from the set of selected cropped images if, for example, the compute device does not execute a facial recognition task(s) for that selected cropped image(s) within a predetermined period of time (e.g., as measured from a time associated with the selected cropped image(s) being received at the remote compute device). Alternatively, if the compute device executes a facial recognition task for a selected cropped image, the compute device can be configured to send a signal to the remote compute device to prevent the remote compute device from executing the facial recognition task for that selected cropped image. As described below, in some instances, the compute device can be configured to cause a selected cropped image associated with a motion track to be replaced, at the remote compute device, with another cropped image from that motion track that has a higher face quality score (described herein) and a lower person quality score.

The compute device can be configured to execute, in sequence, a plurality of facial recognition tasks by processing selected cropped images in sequence. For example, in some implementations, a motion track from a plurality of motion tracks can be selected for processing based on the quality score the selected cropped image associated with that motion track and/or a previous selection of that motion track for processing. For example, in some instances, the compute device can select between (1) a first motion track associated with a first person and having a first selected cropped image and (2) a second motion track associated with a second person and having a second selected cropped image. In some instances (e.g., if neither the first motion track nor the second motion track have been previously processed), the compute device can select the first motion track and execute a first set of facial recognition tasks (described in more detail herein) for a plurality of cropped images (e.g., all cropped images) associated with the first track based on the first cropped image having a higher quality score than the second cropped image. The first set of facial recognition tasks can be performed sequentially (e.g., processing each cropped image from the plurality of cropped images in 1 second intervals, 2 second intervals, and/or the like). The compute device can then execute a second set of facial recognition tasks for the second motion track based on the first motion track having been previously processed by the compute device executing the first set of facial recognition tasks. Thus, in this instance, the compute device can implement a "round robin" to process a plurality of motions tracks, where at least one motion track from the plurality of motion tracks has yet to be processed.

Alternatively, in another implementation, the compute device can be configured to process the first cropped image (e.g., the cropped image having the highest quality score of any other image from the first motion track or the second motion track) and then process the second cropped image (e.g., the cropped image having the highest quality score of any other image from the second motion track). Similarly stated, rather than consecutively processing a plurality of cropped images from a motion track, the compute device can be configured to process a cropped image having the highest quality score for a motion track before selecting another motion track for processing.

In some instances (e.g., if all motion tracks have been processed), the compute device can select a motion track for processing based on a combination of time since that motion track was processed and the quality score associated with that motion track. For example, a motion track can be selected based on the time since the motion track was last processed multiplied by a step function and/or a gain. The step function and/or gain can be determined based on the quality score for the selected cropped image associated with that motion track. Thus, in some instances, a first motion track can be processed more often (and/or, in some instances, consecutively) if the first motion track is associated with a sufficiently high quality score (e.g., relative to a quality score associated with a second motion track). In some implementations, the compute device can be configured to process a motion track based on the quality score associated with the selected cropped image for the motion track being higher than a predetermined threshold. A motion track can be selected for processing at a predefined interval (e.g., every 0.5 seconds, every 1 second) and/or dynamically, e.g., based on available compute resources, in response to detecting an availability of compute resources, etc.

The selected cropped image can be replaced by a more recently generated cropped image if the more recently generated cropped image has a higher quality score than the previously selected cropped image, even if the previously selected cropped image has yet to undergo facial recognition processing (e.g., by the compute device and/or the remote compute device). The selected cropped image can represent a "best" cropped image for a motion track since facial recognition was last performed for that motion track. Thus, the selected cropped image can be reset (e.g., deleted from the motion track) after facial recognition is performed using that selected cropped image, such that another cropped image (e.g., a cropped image generated after the selected cropped image is reset) can be assigned to the motion track while the person associated with the motion track remains in the field of view of the camera.

To execute a facial recognition task, the compute device can be configured use a neural network (e.g., a convolutional neural network (CNN), a yolov5s neural network, and/or the like) to analyze a cropped image associated with the selected motion track. Specifically, the compute device can detect landmarks (e.g., points, elements, etc., associated with an eye, nose, mouth, etc.) of a depicted face and/or generate a bounding box for the depicted face, to produce a face vector (e.g., NesNet-100 vector and/or the like). The compute device can then execute an alignment task to warp the face vector to be in a standard and/or predefined orientation. The compute device can be further configured to generate a quality score (e.g., a "face quality score" and/or a quality score different from "person quality scores" generated for cropped images and used to select motion tracks). The quality score for the face vector can be associated with, for example, a magface loss. The quality score can be higher if the face depicted in the cropped image is oriented towards the camera (e.g., and, therefore, requires less warping and/or alignment correction as compared to a face oriented at a non-zero angle relative to the camera) and/or has a higher resolution. In some implementations, to reduce false positives, the compute device can prevent facial recognition from being performed on a cropped image having a face quality score below a predetermined threshold.

As described above, a selected (e.g., "best") cropped image previously received at the remote compute device based on that selected cropped image having a highest person quality score for the associated motion track can be replaced by another cropped image from that motion track that has a higher face quality score than the selected cropped image.

The compute device can be further configured to permute, based on a permutation value (and/or a permutation vector, a plurality of permutation values, an encryption key, etc.), the face vector to produce a permuted face vector. Specifically, the compute device can use the permutation value to change (e.g., scramble) the order of elements associated with face landmarks and included in the face vector. The permutation value can be received by the compute device (e.g., from a remote compute device associated with an enterprise responsible for the operation of the compute device) and stored in a volatile memory (and not, for example, a flash and/or non-volatile memory) included in the compute device. In some instances, the remote compute device can send the permutation value to a plurality of compute devices (e.g., associated with a plurality of cameras) that includes the compute device. As a result of the permutation value being saved at a volatile memory of the compute device(s), the compute device(s) can be configured to re-fetch the permutation following each reboot (e.g., power cycle) of the compute device. An organization (e.g., associated with the remote compute device) can, therefore, maintain security and/or secrecy of the permutation value without, for example, having to rotate and/or periodically change the permutation value. Instead, the permutation value can remain fixed, and the organization, via the remote compute device, can control whether a compute device(s) can fetch the permutation value upon startup of the compute device(s).

The compute device can be further configured to retrieve face vectors and/or identity data from the remote compute device, periodically (e.g., every 10 minutes, every hour, etc.) and/or in response to a user-initiated request, face vectors from the remote compute device. The face vectors and/or identity data can be associated with a plurality of known persons (e.g., persons of interest). For example, the identity data an indicate a name, date of birth, address, occupation, department, and/or the like, for each person from the plurality of persons. In some instances, the identity data can include a tag (e.g., a person of interest tag), an image (e.g., a user-uploaded image of the person), etc. In some implementations, the compute device can retrieve face vectors that are already permuted based on the permutation value. Alternatively, the compute device can be configured to permute the face vectors after receiving the face vectors from the remote compute device.

Based on the permuted face vector (referred to in this example as the search vector) associated with the cropped image and the permuted face vectors associated with the plurality of known persons (referred to in this example as the stored vectors), the compute device can be configured to search the stored vectors based on the search vector to determine whether the person depicted in the cropped image is a person from the plurality of persons and associated with a stored vector. Specifically, the compute device can determine a match if the search vector is equivalent to or within a predefined distance (e.g., in a vector space) from a stored vector. In some instances, a search vector can be compared with a plurality of exemplars (e.g., user-uploaded images of a person of interest, previously captured images of the person of interest, or other representations (e.g., vectors, etc.) of images of the person of interest). The compute device (and/or the remote compute device) can be configured to generate a plurality of stored vectors for the plurality of stored vectors, and an aggregated probability score can be computed to determine a match between the search vector and the plurality of stored vectors.

In some implementations, a plurality of models (e.g., neural networks or a similarly suited machine learning model) can be used to perform, respectively or collectively, person detection, face detection, alignment (e.g., warping), quality scoring, and/or face vector matching (e.g., facial recognition). The plurality of models can be trained using quantization-aware training techniques that take into account the respective models being quantized (e.g., associated with lower precision, such as 8-bit precision instead of 32-bit precision) when deployed on a target (e.g., the compute device associated with the camera). Quantization aware training can improve model accuracy while the model executes using limited memory and/or processor resources.

If a match is determined between the search vector and a stored vector(s), the compute device can return the identity data associated with that stored vector. The identity data, a track identifier associated with the selected motion track and/or the selected cropped image, and/or the selected cropped image can then be sent to the remote compute device. The remote compute device (or, alternatively, the compute device) can be configured to send a notification (e.g., a text, email, and/or push notification) to a user compute device (e.g., a mobile compute device). The notification can include, for example, the cropped image, a representation of the identity data, and/or the like.

The compute device can be further configured to send the identity data and/or a motion track identifier in the form of, for example, mp4 (and/or the like) metadata, to a front-end device (e.g., a device configured to display a graphical user interface). The front-end device can fetch information about a person of interest, such as person of interest tags, person of interest user-uploaded images, etc., based on the identity data and cause display of the information within a live (e.g., contemporaneous) and/or playback camera video stream. The front-end device can also draw around the person depicted in the video data based on the track identifier.

The compute device can be further configured to record a timestamp associated with a time that facial recognition was performed on a cropped image. The timestamp can be used to determine when a motion track was last processed, such that the compute device can be biased towards selecting a motion track that has been previously processed less recently than other motion tracks.

As described above, the compute device can be configured to send cropped images to the remote compute device. In some instances, if the compute device has performed facial recognition on the cropped image, the compute device can associate the cropped image with metadata (e.g., a permuted face vector for the person identified in the cropped image, metadata associated with a face bounding box, face quality data, a matched person identifier, etc.), sending both the cropped image and the metadata to the remote compute device. If the remote compute device receives the metadata, the remote compute device can be configured to skip performing facial recognition on the associated cropped image. If face metadata is not received by the remote compute device contemporaneous to the remote compute device receiving the cropped image, the remote compute device can be configured to perform facial recognition on the cropped image. For example, in some instances, the compute device can be configured to forward the cropped image to the remote compute device after a predetermined period of time (e.g., as measured from a time that the cropped image was generated), even if the compute device has not performed facial recognition on that cropped image (e.g., as a result of a backlog of other cropped images requiring processing). In this sense, the remote compute device can implement a "fallback pipeline," performing facial recognition on any cropped images that were not processed by the compute device.

Although some examples described herein are in the context of facial recognition, person of interest identification, etc., it should be appreciated that at least some systems, apparatuses, and methods described herein can be used to identify other objects. For example, at least some systems, apparatuses, and methods described herein can be used to identify a specific animal (e.g., a cow) from a group of animals (e.g., a herd) based on identifiable features of that animal (e.g., a fur pattern, etc.). Similarly, at least some systems, apparatuses, and methods described herein can be used to identify a specific vehicle based on, for example, a license plate, damage to the car, custom parts and/or modifications installed on the vehicle, etc.

FIG. 1 includes annotated images showing examples of a motion track 112, an identification 114, and a cropped image 120 of a human generated from video data, according to some embodiments. As shown in the left portion of FIG. 1, video data can include a video frame 110 that can depict, by way of example, a human within the field of view of a video camera that can generate the video data. The video frame 110 can further depict, by way of example, a parked vehicle. An identification 114 can be generated for the human, and the identification 114 can be associated with a motion track 112 based on the identification 114, a motion model (e.g., a Kalman filter), and/or previous identifications from previous video frames from the video data. Although not shown in FIG. 1, an identification can also be generated for the parked vehicle and can be prevented from being assigned to a motion track based on this identification and/or based on a lack of motion associated with the parked car. As shown in the right portion of FIG. 1, a cropped image 120 can be generated based on the identification 114 and the motion track 112. In some implementations, the cropped image 120 can be generated from uncompressed video data that does not include the video frame 110 (which can be, for example, a compressed video frame). In an alternative embodiment, the cropped image 120 can be generated based on video from a camera that is different from the camera used to detect and/or track the object and that surveils the same area of interest.

Figure 2:
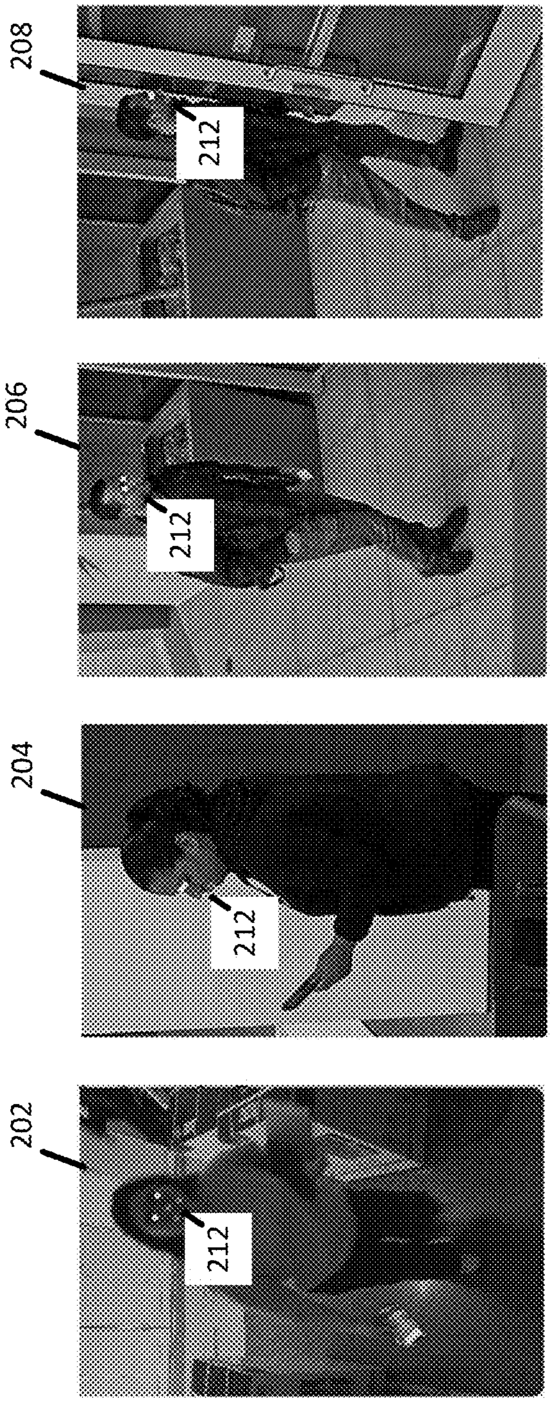
FIG. 2 shows cropped images used to generate quality scores, according to some embodiments.

FIG. 2 includes annotated images showing example cropped images 202-208, according to some embodiments. Each of the cropped images 202-208 can include at least one marker 212 that can be used to determine one or more quality scores (e.g., person quality scores, face quality scores, etc.) for the respective cropped images 202-208. For example, the at least one marker 212 can indicate and/or represent one or more features (e.g., a face) of an object (e.g., a human) that is/are depicted in a cropped image. The at least one marker 212 can include, for example, five markers associated with facial features, such as a left eye, a right eye, a nose, a left mouth portion, and a right mouth portion, respectively. The positions of these markers within the cropped image and/or their positions relative to each other can be used to determine a visibility or occlusion of the face and/or the respective facial features.

Figure 3:
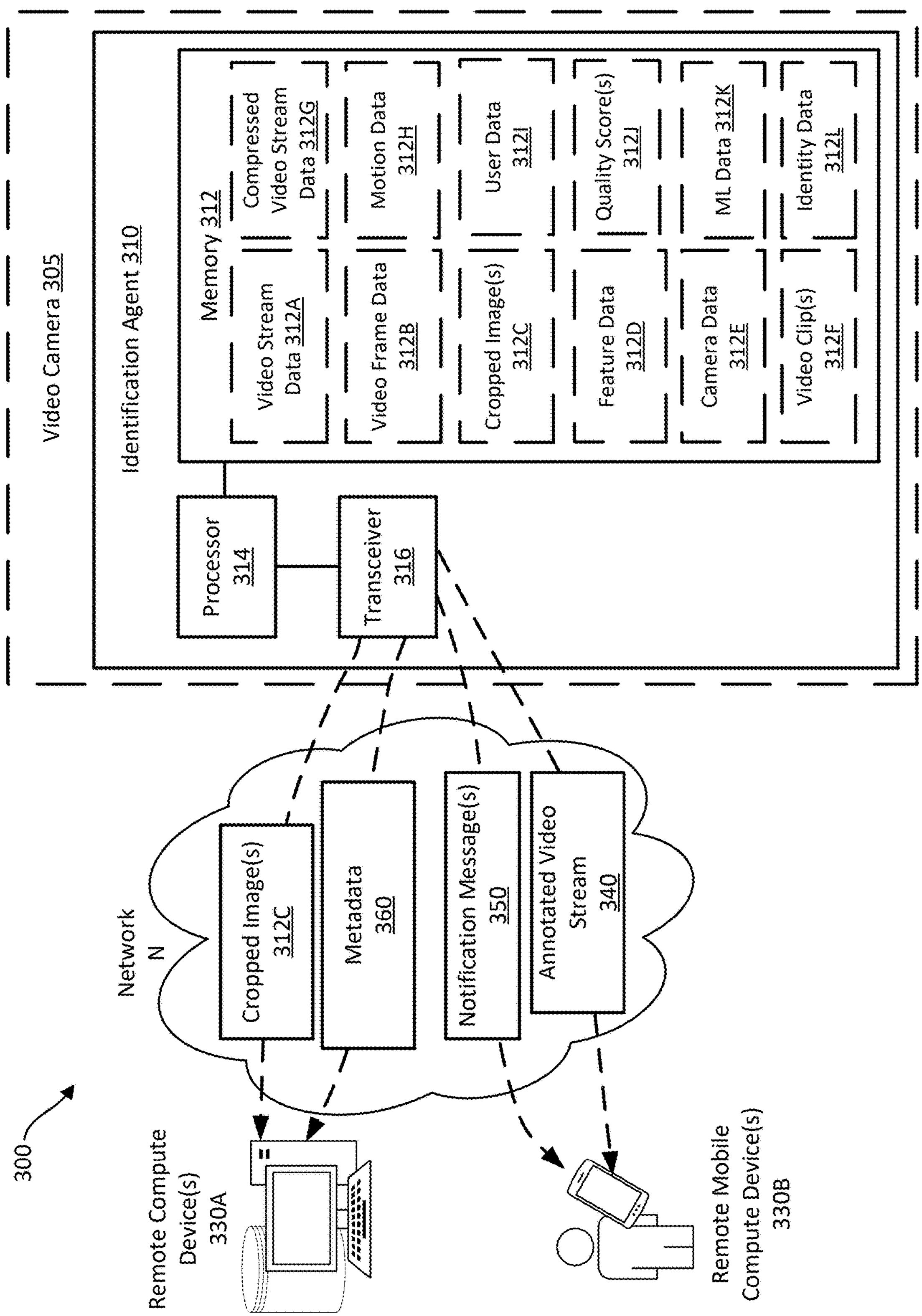
FIG. 3 is a system diagram showing a first example implementation of a system for tracking persons in motion, generating cropped images of the persons, and performing facial recognition, according to some embodiments.

FIG. 3 is a system diagram showing an example implementation of an identification system 300 for identifying objects (e.g., persons) based on a video stream, according to some embodiments. As shown in FIG. 3, the identification agent 310 includes a processor 314 operably coupled to a memory 312 and a transceiver 316. The identification agent 310 is optionally located within, co-located with, located on, in communication with, or as part of a video camera 305. The memory 312 stores one or more of video stream data 312A, video frame data 312B, cropped image(s) 312C, feature data 312D, camera data 312E, video clip(s) 312F, compressed video stream data 312G, motion data 312H, user data 312I, quality score(s) 312J, machine learning (ML) data 312K, or identity data 312L.

The video stream data 312A can include, by way of example only, one or more of video imagery, date/time information, stream rate, originating internet protocol (IP) address, etc. The video frame data 312B can include, by way of example only, one or more of pixel count, object classification(s), video frame size data, etc. The cropped image(s) 312C can include, by way of example, imagery data depicting an object associated with an identification included in the video frame data 312B. The cropped image(s) 312C can include, for example, the cropped image 120 of FIG. 1 and/or the cropped images 202-208 of FIG. 2. The feature data 312D can include, by way of example, an identified feature(s) (e.g., a face and/or a facial feature, or a license plate) of the object depicted in a cropped image. The feature data 312D can be used to determine a quality score(s) (e.g., the quality score(s) 312J, as described herein).

The camera data 312E can include, by way of example only, one or more of camera model data, camera type, camera setting(s), camera age, and camera location(s). The video clip(s) 312F can include, by way of example, a sequence of temporally arranged images that can be used to track motion (e.g., by generating motion tracks) of an object depicted in those temporally arranged images. The compressed video stream data 312G can include, by way of example, lossy video data generated by a video codec (not shown). The compressed video stream data 312G can be generated from the video stream data 312A, the compressed video stream data 312G having a lesser bit rate than the video stream data 312A. The motion data 312H can include, by way of example, at least one of an unconfirmed motion track or a confirmed motion track. Each motion track can be identified by a motion track identifier. The motion data 312H can further include a time and/or a number of sequential video frames that an object has been depicted and/or detected in. The motion data 312H can further include a time and/or a number of video frames since an object detection (e.g., a time that indicates an absence of object detection).

The user data 312I can include, by way of example only, one or more of user identifier(s), user name(s), user location(s), and user credential(s). The user data 312I can also include, by way of example, cropped image transmission frequency, cropped image count per transmission and/or period of time, capture frequency, desired frame rate(s), sensitivity/sensitivities (e.g., associated with each from a plurality of parameters), notification frequency preferences, notification type preferences, camera setting preference(s), user-uploaded exemplar images of persons of interest, etc.

The quality score(s) 312J can include, by way of example only, a metric associated with the visibility of an object and/or a feature of the object. The notification message(s) 350A and/or 350B can include, by way of example only, one or more of an alert, semantic label(s) representing the type(s) of object(s) and/or motion detected, time stamps associated with the cropped image(s) 312C, quality score(s), etc. The ML data 312K can include a plurality of weights associated with, for example, a plurality of nodes included in a neural network. The weights can be determined using quantization-aware training techniques. The identity data 312L can include face vectors (e.g., search vectors and/or stored vectors), a permutation key to permute the face vectors, exemplar images associated with a person of interest, etc.

The identification agent 310 and/or the video camera 305 is communicatively coupled, via the transceiver 316 and via a wired or wireless communications network "N," to one or more remote compute device(s) 330A (e.g., including a processor, memory, and transceiver) such as workstations, desktop computer(s), or servers, and/or to one or more remote mobile compute devices 330B (e.g., including a processor, memory, and transceiver) such as mobile devices (cell phone(s), smartphone(s), laptop computer(s), tablet(s), etc.). In some instances, the one or more remote compute devices 330A can be associated with an organization (e.g., a business that uses the video camera 305 to monitor the business' premises), and the one or more remote mobile compute devices 330B can be associated with a user. During operation of the identification agent 310, and in response to detecting an object and/or motion, in response to generating a cropped image(s) 312C, and/or in response to determining a match between a face vector generated from a cropped image 312C and a stored face vector associated with the identity data 312L, notification message(s) 350 can be automatically generated and sent to one or both of, respectively, the remote compute device(s) 330A or the remote mobile compute device(s) 330B.

In some implementations, although not shown in FIG. 3, the one or more remote compute device(s) 330A can generate and send the notification message(s) 350 to the one or more remote mobile compute device(s) 330B. The notification message(s) 350 can include, by way of example only, one or more of an alert, semantic label(s) representing the type(s) of object(s), the identity of the object(s), and/or motion detected, time stamps associated with the cropped image(s) 312C, quality score(s), etc. Alternatively or in addition, cropped image(s) 312C (or a selection of cropped images, such as the cropped image with the highest quality score for a given motion track) can be automatically sent to the one or more remote compute device(s) 330A in response to detecting an object and/or motion, and the one or more remote compute device(s) 330A can be configured to perform facial recognition on the cropped image(s) 312C if that cropped image(s) 312C has not been processed by the identification agent 310. For example, by sending metadata 360 (which can include, for example, at least a portion of the identity data 312L, at least a portion of the motion data 312H, etc.), the identification agent 310 can indicate to the one or more remote compute device 330A that the identification agent 310 executed a facial recognition task for that cropped image(s) 312C. Alternatively, if the identification agent 310 sends the cropped image(s) 312C and not the metadata 360, the one or more remote compute device(s) 330A can be configured to execute a facial recognition task for that cropped image(s) 312C.

The identification agent 310 can be further configured to send an annotated video stream 340 to a front-end device (e.g., the one or more remote mobile compute device(s) 330B). The annotated video stream 340 can include a bounding box around a person and/or face depicted in the video stream, an exemplar image (e.g., a headshot) of the person overlayed within the video stream, identity data (e.g., name, address, title, etc.) associated with the person, etc. In some implementations, and although not shown in FIG. 3, the front-end device can be configured to generate the annotated video stream 340 based on data (e.g., identity data 312L, motion data 312H, etc.) received from the identification agent 310.

Figure 4:
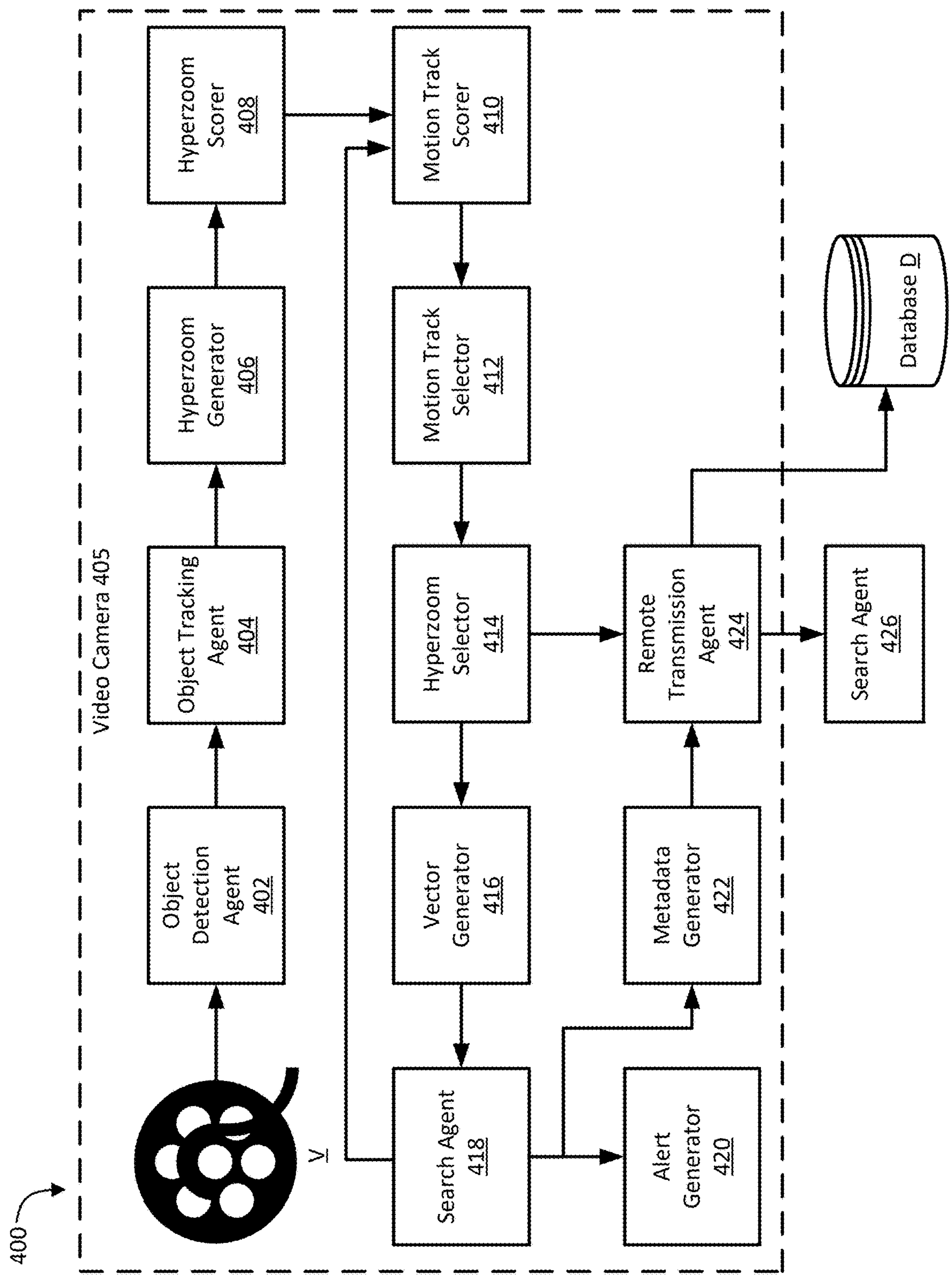
FIG. 4 is a system diagram showing a second example implementation of a system for tracking persons in motion, generating cropped images of the persons, and performing facial recognition, according to some embodiments.

FIG. 4 is a system diagram showing an identification system 400 for generating and transmitting a cropped image(s) that depicts an object captured in a video stream, according to some embodiments. The identification system 400 can be included, for example, in the identification system 300 of FIG. 3. As shown in FIG. 4, the identification system 400 uses, as input, video imagery/data V collected via, by way of example, a video camera 405. Portions of the video imagery/data (e.g., portions that are pertinent to object and/or motion detection, such as date/time information, video frame numbers, short-duration video clips, etc.) can be streamed to the object detection agent 402. In response to the object detection agent 402 detecting and/or classifying an object (e.g., a person) depicted in the video imagery/data V and generating detection data (e.g., an object identification, a feature identification, a bounding box, a frame position, etc.), the detection data can be provided as input to the object tracking agent 404. The object tracking agent 404 can be configured to generate and/or update motion data (e.g., one or more motion tracks) using a motion model and based on the detection data, as described elsewhere herein. The object tracking agent 404 can be further configured to confirm and/or delete a motion track based on the number of object detections associated with a motion track and/or an indication of an absence of detections associated with a motion track. The object tracking agent 404 can provide confirmed motion data to the hyperzoom generator 406, configured to generate a cropped image(s) that depicts the object. In some implementations, as described elsewhere herein, the cropped image(s) can be generated from or based on a region of a video frame, and this video frame can be different (e.g., based on the number of pixels included in the video frame) from a video frame within the video imagery/data V provided as input to the object detection agent 402 and/or the object tracking agent 404.

The cropped image(s) can be provided as input to the hyperzoom scorer 408, which can be configured to assign an image quality score to each of the cropped image(s) generated by the hyperzoom generator 406. An image quality score can be associated with, by way of example, a visibility of an object and/or a feature of the object, as described elsewhere herein. In some implementations, the hyperzoom scorer 408 can also receive object identification data generated by the object detection agent 402, such that the generated image quality score(s) are tailored for an object included in a specified class.

The motion track scorer 410 can use the highest image quality score (generated by the hyperzoom scorer 408) for each motion track (generated by the object tracking agent 404) to identify the best cropped image for each motion track. Based on this highest image quality score and elapsed time periods since respective motion tracks have been processed (as indicated by timestamps generated by a search agent 418, described herein), the motion track scorer 410 can generate a motion track score for each motion track. Since the motion track scorer 410 accounts for elapsed time, the generated motion track score can change dynamically with time. A motion track selector 412 can determine the motion track with the highest motion track score and select that motion track for facial recognition processing. A hyperzoom selector 414 can select the cropped image with the highest image quality score and send that cropped image to a remote transmission agent 424, which in turn can send that cropped image to a remote compute device (described herein). The hyperzoom selector 414 can also forward that cropped image (and/or sequentially forward each cropped image associated with the selected motion track) to a vector generator 416.

Alternatively, in some instances, the hyperzoom selector 414 can select the cropped image for face processing on-camera (e.g., via a processor included in the video camera 405) without the cropped image being sent to the remove compute device via the remote transmission agent 424. For example, the selected cropped image can be prioritized for sending to the remote compute device based on a face quality score determined by the vector generator 416 (described herein) and/or if the search agent 418 (described herein) determines a match with a person of interest. If, however, the cropped image is a first cropped image, and there is a second cropped image associated with the same motion track (e.g., a second cropped image depicting the same person and/or captured within a predefined time period of the first cropped image), this second cropped image can be sent to the remote compute device instead of the first cropped image (e.g., based on respective face quality scores for the first cropped image and the second cropped image). In some instances, none of the cropped images associated with a motion track (e.g., none of the cropped images depicting a specific person and/or captured within a predefined time period) can be sent to the remote compute device based on each of these cropped images having a low face quality score (e.g., that is below a predefined threshold). Instead, a cropped image that (1) was not previously processed (e.g., by the vector generator 416 and/or the search agent 418), (2) is associated with a different motion track, and/or (3) has (or potentially has) a higher face quality score, can be sent to the remote compute device for facial processing.

The vector generator 416 can be configured to identify landmarks (e.g., facial landmarks) within a cropped image and represent those landmarks as elements within a vector (e.g., a face vector). The vector generator 416 can be further configured to align the vector according to a predefined and/or standardized orientation and/or permute the vector based on a permutation value (e.g., an encryption key), to produce a permuted vector. Additionally, the vector generator 416 can be configured to compute a face quality score (which can be different than the image (e.g., person) quality score determined for the cropped image). The permuted vector can be received by the search agent 418, which can compare the permuted vector to a plurality of stored vectors associated with objects (e.g., persons) of interest to identify an object depicted in the cropped image and/or associated with the permuted vector. As a result of performing the comparison, the search agent 418 can be configured to send a timestamp to the motion track scorer 410, such that the motion track scorer 410 can update the elapsed time since previous processing (and, thus, the motion track score) for that motion track.

If the search agent 418 determines a match between the permuted vector generated by the vector generator 416 and a stored vector associated with an object of interest, an alert generator 420 can cause an alert (e.g., a notification, display of a cropped image, display of an annotated video stream, etc.) at a remote, mobile, and/or front-end compute device. In further response to the search agent 418 determining a match, a metadata generator 422 can send metadata via the remote transmission agent 424 to a remote compute device that includes the search agent 426. Having previously received the cropped image from the hyperzoom selector 414 and via the remote transmission agent 424, the search agent 426, having received the metadata from the metadata generator 422, can exclude the cropped image from additional facial recognition processing performed by the search agent 426. Alternatively, if the search agent 426 does not receive metadata via the remote transmission agent 424 within a predetermined time period, the search agent 426 can perform facial recognition on the received cropped image. In some instances, the cropped image received at the search agent 426 can be the cropped image having the person quality score for a given motion track, although this cropped image can be replaced, via the remote transmission agent 424, by a cropped image having a higher face quality score (albeit a lower person quality score).

The remote transmission agent 424 can be further configured to cause a cropped image and/or face vector, determined to match an object of interest, to be stored at a database D, such that the cropped image and/or face vector can be used as an additional exemplar in a future search involving that object (e.g., person). Having additional exemplars available for comparison can improve the probability that a depicted person captured in video data is correctly identified. In some implementations, the remote transmission agent 424 can cause the cropped image and/or face vector to be stored at the databased D if the cropped image has a sufficient face quality score (e.g., as compared to a predetermined threshold and/or a face quality score(s) for an exemplar(s) previously stored at the database D).

Figure 5:
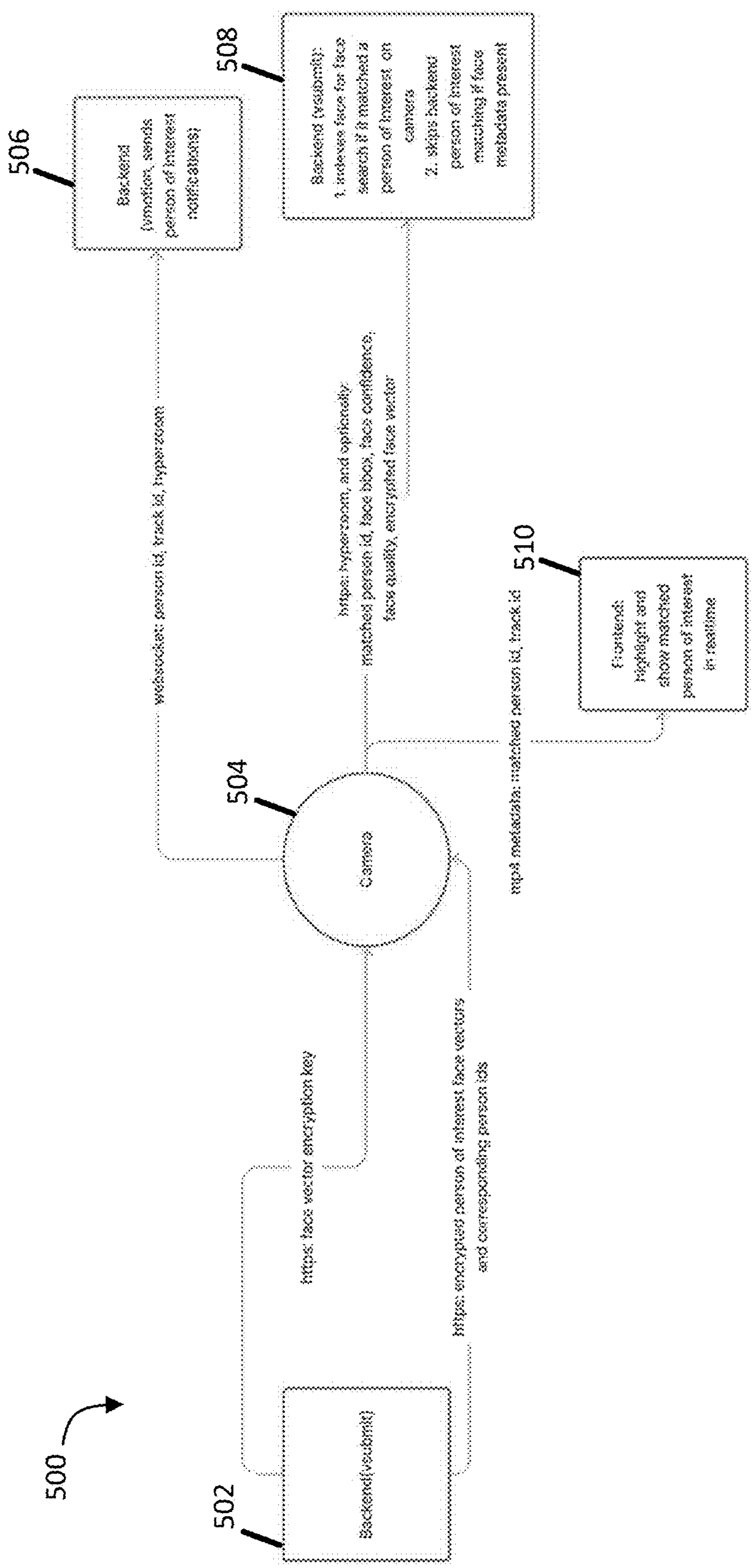
FIG. 5 is a system diagram showing a third example implementation of a system for tracking persons in motion, generating cropped images of the persons, and performing facial recognition, according to some embodiments.

FIG. 5 is a system diagram showing an identification system 500 for generating cropped image(s) that depicts a person captured in a video stream, identifying the person based on person of interest vectors, and generating notifications, according to some embodiments. The identification system 500 can be included, for example, in the identification system 300 of FIG. 3 and/or the identification system 400 of FIG. 4. As shown in FIG. 5, the identification system 500 includes a backend device 502, a camera 504, a backend device 506, a backend device 508, and a frontend device 510. In some implementations, the backend devices 502, 506, and 508 and/or the frontend device 510 can be one or more remote (e.g., as to the camera) compute devices. In some implementations, the backend devices 502, 506, and 508 can be the same remote compute device. The frontend device can include a screen configured to display streaming video data.

The backend device 502 can send (e.g., via Hypertext Transfer Protocol Secure (https)) a face vector encryption key (e.g., a permutation value), encrypted person of interest face vectors, and/or person identification data (person ids) to the camera 504. Based on video data recorded by the camera 504, the camera 504 can send (e.g., via a websocket) a person id, a track identifier (track id), and/or a hyperzoom to the backend device 506, which can be configured to generate and send a person of interest notification to, for example, a mobile compute device and/or a user compute device. Via https, the camera 504 can be further configured to send to the backend device 508 a hyperzoom and, optionally, a matched person identifier, a face bounding box (face bbox), a face confidence score (e.g., a confidence value associated with a classification of the face), a face quality score, and/or an encrypted (e.g., permuted) face vector. The backend device 508 can index a processed face for future face searching in response to the processed face matching a person of interest (as determined at the camera 504). The backend device 508 can also skip executing a facial recognition task for a hyperzoom if the backend device 508 receives metadata associated with the hyperzoom.

The camera 504 can also be configured to send a matched person id and a track id (e.g., in the form of mp4 metadata) to the frontend device 510, and the frontend device 510 can generate a video clip (e.g., a highlight) that can show the matched person of interest (annotated with a bounding box, personal identity information, etc.) in real-time (or near real-time).

Figure 6:
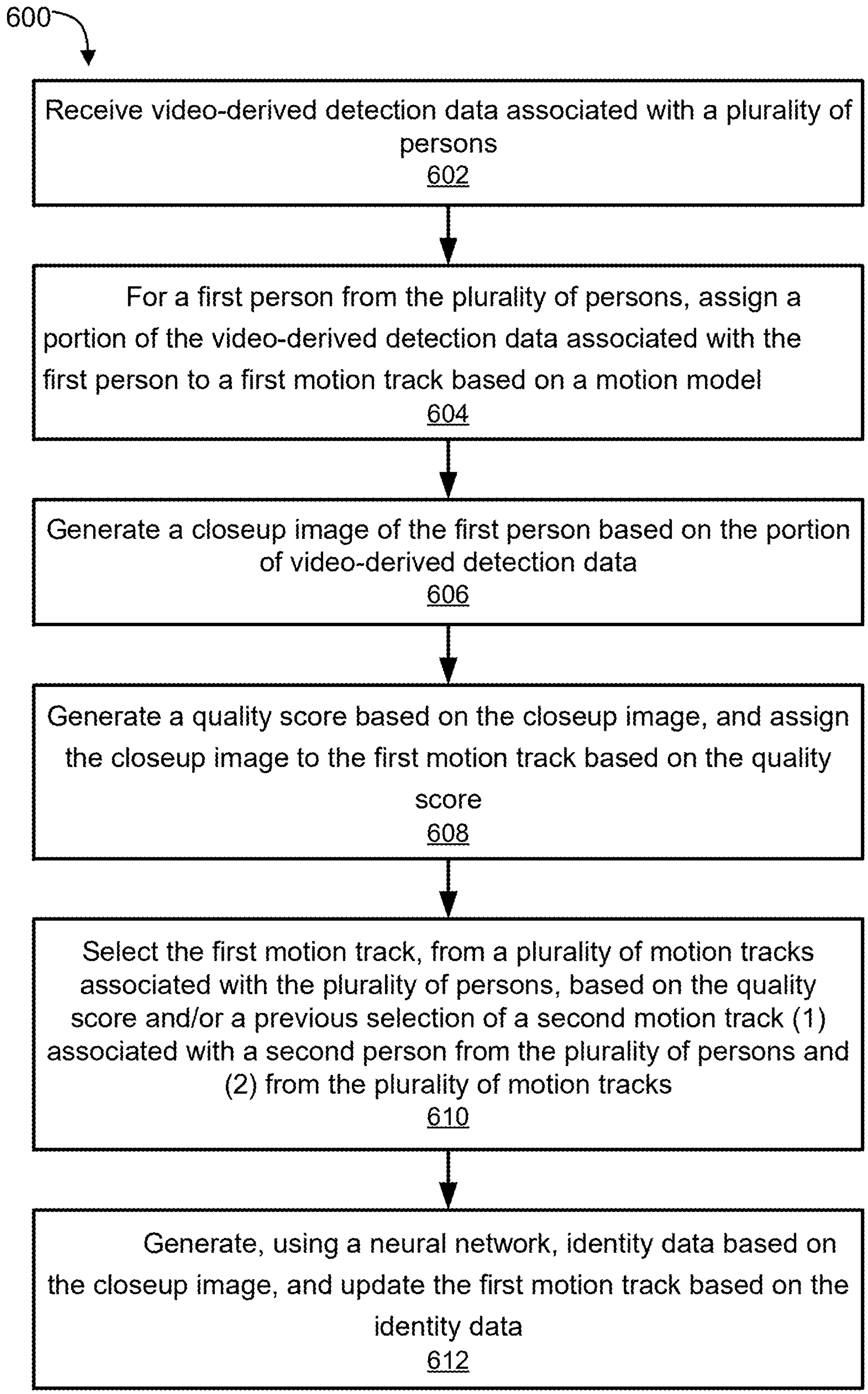
FIG. 6 is a flow diagram showing a method for generating identity data for an object captured in a video stream, according to some embodiments.

FIG. 6 is a flow diagram showing a method 600 for generating identity data for an object captured in a video stream, according to some embodiments. The method 600 can be implemented, for example, using the identification systems 300, 400, and/or 500 of FIGS. 3, 4, and 5, respectively. As shown in FIG. 6, the method 600 includes receiving, at 602, video-derived detection data associated with a plurality of persons. At 604, for a first person from the plurality of persons, a portion of the video-derived detection data associated with the first person is assigned to a first motion track based on a motion model, and at 606, a closeup image of the first person is generated based on the portion of video-derived detection data. A quality score is generated at 608 based on the closeup image, and the closeup image is assigned to the first motion track based on the quality score. The method 600 at 610 includes selecting the first motion track from a plurality of motion tracks associated with the plurality of persons, based on at least one of the quality score or a previous selection of a second motion track (1) associated with a second person from the plurality of persons and (2) from the plurality of motion tracks. At 612, using a neural network, first identity data is generated based on the closeup image, and the first motion track is updated based on the first identity data.

Figure 7:
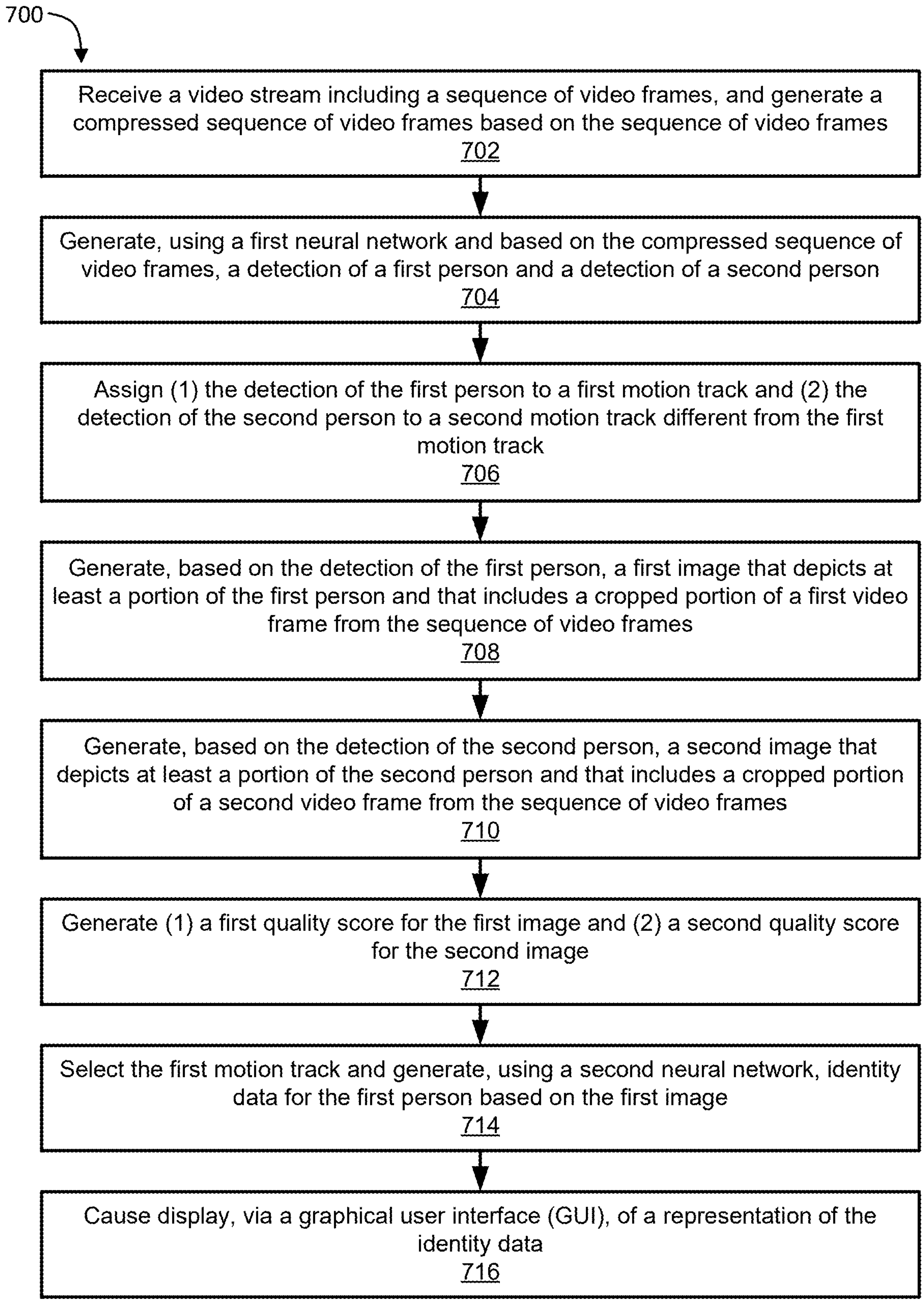
FIG. 7 is a flow diagram showing a method for generating a cropped image(s) that depicts an object captured in a video stream and identifying that object, according to some embodiments.

FIG. 7 is a flow diagram showing a method 700 for generating a cropped image(s) that depicts an object captured in a video stream and identifying that object, according to an embodiment. The method 600 can be implemented, for example, using the identification systems 300, 400, and/or 500 of FIGS. 3, 4, and 5, respectively. As shown in FIG. 7, the method 700, at 702, includes receiving a video stream including a sequence of video frames and generate a compressed sequence of video frames based on the sequence of video frames. Using a first neural network and based on the compressed sequence of video frames, at 704, a detection of a first person and a detection of a second person are generated. At 706, the detection of the first person is assigned to a first motion track and the detection of the second person is assigned to a second motion track different from the first motion track. Based on the detection of the first person, the method 700 at 708 includes generating a first image that depicts at least a portion of the first person and that includes a cropped portion of a first video frame from the sequence of video frames. Based on the detection of the second person, at 710, a second image is generated, the second image depicting at least a portion of the second person and including a cropped portion of a second video frame from the sequence of video frames. At 712, a first quality score for the first image and a second quality score for the second image are generated. At 714, the first motion track is selected based on at least one of (1) the first quality score being above a predefined threshold value, (2) the first quality score being greater than the second quality score, or (3) a previous selection of the second motion track. Also at 714, in response to selecting the first motion track and using a second neural network, first identity data is generated for the first person based on the first image. The method 700 at 716 includes causing display, via a graphical user interface (GUI), of a representation of the first identity data.

In some embodiments, a non-transitory, processor-readable medium stores instructions that, when executed by a processor, cause the processor to receive video-derived detection data associated with a plurality of persons. For a first person from the plurality of persons, a portion of the video-derived detection data associated with the first person is assigned to a first motion track based on a motion model, and a closeup image of the first person is generated based on the portion of video-derived detection data. The instructions also cause the processor to generate a quality score based on the closeup image and assign the closeup image to the first motion track based on the quality score. The first motion track is selected from a plurality of motion tracks associated with the plurality of persons, based on at least one of the quality score or a previous selection of a second motion track (1) associated with a second person from the plurality of persons and (2) from the plurality of motion tracks. Using a neural network, first identity data is generated based on the closeup image, and the first motion track is updated based on the first identity data.

In some implementations, the non-transitory, processor-readable medium can further store instructions to cause the processor to, in response to generating the identity data, cause display of at least one of the identity data, the closeup image, or the portion of the video-derived detection data. Alternatively or in addition, in some implementations, the instructions to select the first motion track can include instructions to select the first motion track further based on the first motion track not having been previously selected. Alternatively or in addition, in some implementations, the instructions to select the first motion track can include instructions to select the first motion track further based on the first motion track having been previously selected before the previous selection of the second motion track. Alternatively or in addition, in some implementations, the instructions to select the first motion track can include instructions to select the first motion track further based on the quality score being above a predefined threshold value. Alternatively or in addition, in some implementations, the instructions to generate the identity data can include instructions to generate a face vector based on the closeup image and search a face vector database based on the face vector to return the identity data. The face vector database can include a memory that stores a plurality of face vectors associated with persons of interest (e.g., face vectors generated from prior images of those persons of interest).

Alternatively or in addition, in some implementations, the instructions to generate the identity data can include instructions to (1) retrieve a permutation value from a volatile memory, (2) generate a face vector based on the closeup image, (3) permute the face vector based on the permutation value to produce a permuted face vector, and (4) search a face vector database based on the permuted face vector to return the identity data. Alternatively or in addition, in some implementations, the motion model can include a Kalman filter. Alternatively or in addition, in some implementations, the non-transitory, processor-readable medium can further store instructions to cause the processor to cause the closeup image to be sent to a remote compute device. Additionally, in response to generating the identity data, the instructions can cause a signal to be sent to the remote compute device to prevent the remote compute device from generating the identity data based on the closeup image.

Alternatively or in addition, in some implementations, the non-transitory, processor-readable medium can further store instructions to cause the processor to cause a representation of the closeup image to be included in a face vector database based on the identity data and the quality score. Alternatively or in addition, in some implementations, the processor can be included in a video camera, and the neural network can be configured to be executed by the processor based on a quantization-aware training technique. Alternatively or in addition, in some implementations, the video-derived detection data can be associated with image data having a first image resolution, and the closeup image can have a second image resolution that is greater than the first image resolution. Alternatively or in addition, in some implementations, the non-transitory, processor-readable medium can further store instructions to cause the processor to (1) delete the first motion track based on a detection associated with an absence of the first person during a first time period and (2) reinstate the first motion track based on a detection associated with the first person during a second time period.

In some embodiments, an apparatus comprises a processor and a memory operably coupled to the processor, the memory storing instructions to cause the processor to receive a video stream including a sequence of video frames and generate a compressed sequence of video frames based on the sequence of video frames. Using a first neural network and based on the compressed sequence of video frames, a detection of a first person and a detection of a second person are generated. The detection of the first person is assigned to a first motion track and the detection of the second person is assigned to a second motion track different from the first motion track. Based on the detection of the first person, the instructions cause the processor to generate a first image that depicts at least a portion of the first person and that includes a cropped portion of a first video frame from the sequence of video frames. Based on the detection of the second person, a second image is generated, the second image depicting at least a portion of the second person and including a cropped portion of a second video frame from the sequence of video frames. A first quality score for the first image and a second quality score for the second image are generated, and the first motion track is selected based on at least one of (1) the first quality score being above a predefined threshold value, (2) the first quality score being greater than the second quality score, or (3) a previous selection of the second motion track. In response to selecting the first motion track and using a second neural network, first identity data is generated for the first person based on the first image. The instructions further cause the processor to cause display, via a graphical user interface (GUI), of a representation of the first identity data.

In some implementations, the apparatus can further include a video camera operably coupled to the processor, the video stream being generated by the video camera. Alternatively or in addition, in some implementations, at least one of the first neural network or the second neural network can be a neural network that has been trained using a quantization-aware training technique. Alternatively or in addition, in some implementations, the identity data can be first identity data, and the memory can further store instructions to cause the processor to (1) cause the second image to be sent to a remote compute device and (2) cause the remote compute device to generate second identity data based on the second motion track not being selected within a predefined time period. Alternatively or in addition, in some implementations, the instructions to generate the first quality score can include instructions to generate the first quality score based on at least one of: (1) an orientation of the first person as depicted in the first image, (2) a position of at least one pixel within a video frame, from the sequence of video frames, that is associated with the first image, the at least one pixel representing at least a portion of the first person, or (3) a visibility metric of a face of the first person as depicted in the first image.

Alternatively or in addition, in some implementations, the instructions to generate the identity data can include instructions to generate the identity data based on a third quality score calculated based on a face metric being above a predetermined threshold, the face metric being associated with a face of the first person depicted in the first image. Alternatively or in addition, in some implementations, the face metric can be associated with at least one of a resolution metric, a size metric, or an orientation metric. An orientation metric can include, for example an orientation angle of the face relative to the for example (e.g., Alternatively or in addition, in some implementations, the face metric can be a first face metric, and the memory can further store instructions to cause the processor to generate, based on the detection of the first person, a set of images, each image from the set of images (1) depicting at least a portion of the first person and (2) including a cropped portion of a video frame different from (a) the first video frame and (b) remaining video frames from the sequence of video frames. Additionally, the instructions can cause the processor to cause an image from the set of images to be sent to a remote compute device based on a fourth quality score associated with the image being lower than the first quality score. Additionally, the instructions can cause the first image to be sent to the remote compute device based on the first face metric being higher than a second face metric associated with the image. The instructions can also cause the processor to prevent first image from being processed by the remote compute device based on the identity data being generated with a predefined time period. Alternatively or in addition, in some implementations, the instructions to generate the identity data can include instructions to (1) generate a face vector based on the first image and (2) search a face vector database based on the face vector to return the identity data.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory, processor-readable medium storing instructions that, when executed by a processor, cause the processor to:

receive video-derived detection data associated with a plurality of persons;

for a first person from the plurality of persons:

assign a portion of the video-derived detection data associated with the first person to a first motion track based on a motion model, generate a closeup image of the first person based on the portion of video-derived detection data, generate a quality score based on the closeup image, and assign the closeup image to the first motion track based on the quality score;

select the first motion track, from a plurality of motion tracks associated with the plurality of persons, based on at least one of the quality score or a previous selection of a second motion track (1) associated with a second person from the plurality of persons and (2) from the plurality of motion tracks;

generate, using a neural network, identity data based on the closeup image; and update the first motion track based on the identity data.

2. The non-transitory, processor-readable medium of claim 1, further storing instructions to cause the processor to, in response to generating the identity data, cause display of at least one of the identity data, the closeup image, or the portion of the video-derived detection data.

3. The non-transitory, processor-readable medium of claim 1, wherein the instructions to select the first motion track include instructions to select the first motion track further based on the first motion track not having been previously selected.

4. The non-transitory, processor-readable medium of claim 1, wherein the instructions to select the first motion track include instructions to select the first motion track further based on the first motion track having been previously selected before the previous selection of the second motion track.

5. The non-transitory, processor-readable medium of claim 1, wherein the instructions to select the first motion track include instructions to select the first motion track further based on the quality score being above a predefined threshold value.

6. The non-transitory, processor-readable medium of claim 1, wherein the instructions to generate the identity data include instructions to:

generate a vector based on the closeup image; and search a vector database based on the vector to return the identity data.

7. The non-transitory, processor-readable medium of claim 1, wherein the instructions to generate the identity data include instructions to:

retrieve a permutation value from a volatile memory;

generate a vector based on the closeup image;

permute the vector based on the permutation value to produce a permuted vector; and search a vector database based on the permuted vector to return the identity data.

8. The non-transitory, processor-readable medium of claim 1, wherein the motion model includes a Kalman filter.

9. The non-transitory, processor-readable medium of claim 1, further storing instructions to cause the processor to:

cause the closeup image to be sent to a remote compute device; and in response to generating the identity data, cause a signal to be sent to the remote compute device to prevent the remote compute device from generating the identity data based on the closeup image.

10. The non-transitory, processor-readable medium of claim 1, further storing instructions to cause the processor to cause a representation of the closeup image to be included in a face vector database based on the identity data and the quality score.

11. The non-transitory, processor-readable medium of claim 1, wherein:

the processor is included in a video camera; and the neural network is configured to be executed by the processor based on a quantization-aware training technique.

12. The non-transitory, processor-readable medium of claim 1, wherein:

the video-derived detection data is associated with image data having a first image resolution; and the closeup image has a second image resolution that is greater than the first image resolution.

13. The non-transitory, processor-readable medium of claim 1, further storing instructions to cause the processor to:

delete the first motion track based on a detection associated with an absence of the first person during a first time period; and reinstate the first motion track based on a detection associated with the first person during a second time period.

14. An apparatus, comprising:

a processor; and a memory operably coupled to the processor, the memory storing instructions to cause the processor to:

receive a video stream including a sequence of video frames;

generate a compressed sequence of video frames based on the sequence of video frames;

generate, using a first neural network and based on the compressed sequence of video frames, a detection of a first person and a detection of a second person;

assign (1) the detection of the first person to a first motion track and (2) the detection of the second person to a second motion track different from the first motion track;

generate, based on the detection of the first person, a first image that depicts at least a portion of the first person and that includes a cropped portion of a first video frame from the sequence of video frames;

generate, based on the detection of the second person, a second image that depicts at least a portion of the second person and that includes a cropped portion of a second video frame from the sequence of video frames;

generate (1) a first quality score for the first image and (2) a second quality score for the second image;

select the first motion track based on at least one of (1) the first quality score being above a predefined threshold value, (2) the first quality score being greater than the second quality score, or (3) a previous selection of the second motion track;

in response to selecting the first motion track, generate, using a second neural network, identity data for the first person based on the first image; and cause display, via a graphical user interface (GUI), of a representation of the identity data.

15. The apparatus of claim 14, further comprising a video camera operably coupled to the processor, the video stream being generated by the video camera.

16. The apparatus of claim 14, wherein at least one of the first neural network or the second neural network is a neural network that has been trained using a quantization-aware training technique.

17. The apparatus of claim 14, wherein the identity data is first identity data, and the memory further stores instructions to cause the processor to:

cause the second image to be sent to a remote compute device; and cause the remote compute device to generate second identity data based on the second motion track not being selected within a predefined time period.

18. The apparatus of claim 14, wherein:

the instructions to generate the first quality score include instructions to generate the first quality score based on at least one of: (1) an orientation of the first person as depicted in the first image, (2) a position of at least one pixel within a video frame, from the sequence of video frames, that is associated with the first image, the at least one pixel representing at least a portion of the first person, or (3) a visibility metric of a face of the first person as depicted in the first image.

19. The apparatus of claim 14, wherein the instructions to generate the identity data include instructions to generate the identity data based on a third quality score determined by a face metric associated with a face of the first person depicted in the first image.

20. The apparatus of claim 19, wherein the face metric is associated with at least one of a resolution metric, a size metric, or an orientation metric.

21. The apparatus of claim 19, wherein the face metric is a first face metric, the memory further storing instructions to cause the processor to:

generate a set of images based on the detection of the first person, each image from the set of images (1) depicting at least a portion of the first person and (2) including a cropped portion of a video frame different from (a) the first video frame and (b) remaining video frames from the sequence of video frames;

cause an image from the set of images to be sent to a remote compute device based on a fourth quality score that is associated with the image from the set of images and that is lower than the first quality score;

cause the first image to be sent to the remote compute device based on the first face metric being higher than a second face metric associated with the image from the set of images; and prevent the first image from being processed by the remote compute device based on the identity data being generated with a predefined time period.

22. The apparatus of claim 14, wherein the instructions to generate the identity data include instructions to:

generate a face vector based on the first image; and search a face vector database based on the face vector to return the identity data.

23. The apparatus of claim 14, wherein the memory further stores instructions to cause the processor to cause a representation of the first image to be included in a face vector database based on the identity data and the first quality score.

* * * * *